United States Patent [19]

Takahashi et al.

[11] Patent Number: 5,903,447
[45] Date of Patent: May 11, 1999

[54] CURRENT-MODE CONTROL DEVICE AND SWITCHING POWER SUPPLY EMPLOYING SAME

[75] Inventors: Seiichi Takahashi, Sagamihara; Yasuo Ohashi, Tokyo-to; Koji Nishi, Yokohama, all of Japan

[73] Assignee: Murata Manufacturing Co., Ltd., Japan

[21] Appl. No.: 09/111,599

[22] Filed: Jul. 7, 1998

[30] Foreign Application Priority Data

Jul. 23, 1997 [JP] Japan ................................ 9-212430

[51] Int. Cl.⁶ .................................................. H02M 3/335
[52] U.S. Cl. .................................. 363/21; 363/79; 363/97
[58] Field of Search ............................ 363/16, 20, 21, 363/78, 79, 80, 97, 124, 131

[56] References Cited

U.S. PATENT DOCUMENTS

| | | | |
|---|---|---|---|
| 4,684,859 | 8/1987 | Nohmi et al. | 363/124 |
| 5,371,667 | 12/1994 | Nakao et al. | 363/124 |
| 5,661,394 | 8/1997 | Nakao et al. | 363/124 X |

*Primary Examiner*—Peter S. Wong
*Assistant Examiner*—Y. J. Han
*Attorney, Agent, or Firm*—Ostrolenk, Faber, Gerb & Soffen, LLP

[57] ABSTRACT

A current-mode control device for controlling an output voltage of a DC power supply including: a switching element for supplying an output voltage of the DC power supply through an on/off switching action; an output voltage detector circuit for detecting the output voltage of the DC power supply and outputting an output voltage based on the output voltage of the DC power supply; a current sense circuit for converting into a voltage a switching current flowing through the switching element during the switch-on period of the switching element to sense and output the resulting voltage; an integrating circuit for converting the switching current of the switching circuit that increases at a gradient of a straight line linear function with time during of the switch-on period of the switching element into a voltage that increases at a rate defined by a quadratic or higher-order curved line with time by integrating the switching current of the switching circuit at least once and for superimposing the resulting voltage on the output voltage of the current sense circuit; and a switching control circuit for controlling the on/off switching action of the switching element in response to the output voltage of the output voltage detector circuit and the output voltage of the current sense circuit on which the output voltage of the integrating circuit is superimposed such that the output voltage of the DC power supply is stabilized.

10 Claims, 6 Drawing Sheets

CURRENT-MODE CONTROL DEVICE AND SWITCHING POWER SUPPLY EMPLOYING SAME

BACKGROUND OF THE INVENTION

1. Field of the Invention

The present invention relates to a current-mode control device and a switching power supply having a current-mode control device, and more particularly to a slope compensation circuit used in a current-mode control device that is built into a current-mode type DC-DC converter, a current-mode type switching power supply or the like.

2. Description of the Related Art

FIG. 5 shows a switching power supply having a current-mode control device with a slope compensation circuit. The switching power supply is disclosed in Japanese Examined Utility Model Publication No. 7-39346 shown and is of an isolating type with a transformer 1, in which the switching on/off action of a switching element 2 (switching element constructed of a MOS-FET in the example in FIG. 5) connected to the primary coil N1 of the transformer 1 induces a voltage in the secondary coil N2 of the transformer 1 based on the input voltage supplied by a DC power supply 3, and the voltage induced in the secondary coil N2 is rectified and smoothed by a rectifying and smoothing circuit 4 to output an output voltage $V_{out}$ to a load.

To output stably the predetermined output voltage $V_{out}$, the switching power supply has a current-mode control device 5 that switching-controls the switching element 2 in a current-mode control.

As shown in FIG. 5, the current-mode control device 5 includes a current transformer 6 for detecting a switching current flowing through the switching element 2, a resistor 7 is connected in parallel with the output side of the current transformer 6, the anode of a diode D1 is connected to the output of the current transformer 6, the cathode of the diode D1 is connected to one terminal of a resistor 8, and the other terminal of the resistor 8 is grounded. The node X of the diode D1 and the resistor 8 is connected to a predetermined input terminal of a switching control circuit 10.

The node X of the diode D1 and the resistor 8 is also connected to one terminal of a resistor 11, the other terminal of the resistor 11 is respectively connected to the anode of a diode D2, one terminal of a resistor 12, and one terminal (input side) of a capacitor C1, the cathode of the diode D2 is connected to the other terminal of the resistor 12, and the other terminal of the capacitor C1 is grounded.

The node Y of the diode D2 and the resistor 12 is connected to the node Z of the emitter of an NPN transistor 13 and the emitter of a PNP transistor 14. The collector of the transistor 13 is connected to a power supply $V_{cc}$, and the collector of the transistor 14 is grounded. The bases of both transistors 13, 14 are connected to each other, and the node of these bases is connected to an output terminal of the switching control circuit 10. The node Z of the emitter of the transistor 13 and the emitter of the transistor 14 is connected to the gate of the switching element 2.

The non-inverting input terminal of an operational amplifier 15 is connected to the output of the rectifying and smoothing circuit 4, the inverting input terminal of the operational amplifier 15 is connected to a DC power supply V1, and the output of the operational amplifier 15 is connected to a predetermined input terminal of the switching control circuit 10.

A current sense circuit 16 is constructed of the current transformer 6, resistors 7, 8 and diode D1. A slope compensation circuit 18 is constructed of resistors 11, 12, diode D2, and capacitor C1. A drive circuit 19 is constructed of the NPN transistor 13 and PNP transistor 14. An output voltage detector circuit 20 is constructed of the operational amplifier 15 and DC power supply V1.

The switching control circuit 10 includes a circuit arrangement that switching-controls the switching element 2 to regulate the output voltage $V_{out}$ by outputting a rectangular wave pulse signal having a switching period of T as shown in FIG. 6A and variably controlling the on period t of the pulse signal through current-mode control.

The current-mode control device 5 is thus constructed, and the operation of the current-mode control device 5 is briefly discussed here. When the on signal is supplied by the switching control circuit 10, the transistor 13 of the drive circuit 19 is turned on, and the transistor 14 of the drive circuit 19 is turned off, and a drive voltage is applied from the power supply $V_{cc}$ to the gate of the switching element 2 of the drive circuit 19 via the transistor 13, thereby turning on the switching element 2. A switching current $I_{sw}$ flowing through the switching element 2 during the switch-on period increases at a gradient of ml of a linear straight line as shown by a full line A in FIG. 7, the switching current $I_{sw}$ is then detected and converted into a voltage by the current sense circuit 16, and the current sense circuit 16 outputs a voltage $V_{sp}$ represented by a dotted line in FIG. 6C or the full line A in FIG. 7, having a gradient identical to the gradient ml of the switching current $I_{sw}$ of the switching element 2.

During the switch-on period of the switching element 2, a current flows from the power supply $V_{cc}$, to the capacitor C1 through the transistor 13 and resistor 12, charging the capacitor C1. The voltage at the capacitor C1 rises at a gradient of the straight line of a linear function with time as shown in FIG. 6B. The voltage at the capacitor C1 is output across the resistor 11 as the output of the slope compensation circuit 18, and the output of the slope compensation circuit 18 is then superimposed on the output voltage $V_{sp}$ of the current sense circuit 16, thereby compensating for the slope of the output voltage $V_{sp}$ of the current sense circuit 16, and a voltage $V_{s/}$ represented by the full line in FIG. 6C is then applied to the switching control circuit 10.

The operational amplifier 15 detects the output voltage $V_{out}$ of the switching power supply, amplifies the differential voltage between the output voltage $V_{out}$ and the voltage of the power supply V1, and outputs to the switching control circuit 10 a voltage $V_{op}$ responsive to the output voltage $V_{out}$, and the switching control circuit 10 thus determines the timing of switching off of the switching element 2 to regulate the output voltage $V_{out}$ through current-mode control based on the output voltage $V_{s/}$ of the current sense circuit 16 and the output voltage $V_{op}$ of the operational amplifier 15.

The voltage $V_{s/}$ of the current sense circuit 16 increases as represented by the full line in FIG. 6C subsequent to the switch-on of the switching element 2, and when the voltage $V_{s/}$ reaches the output voltage $V_{op}$ of the operational amplifier 15, the switching control circuit 10 outputs an off signal. For example, when the output voltage $V_{out}$ is lower than a preset voltage, the output voltage $V_{op}$ of the operational amplifier 15 rises and the time required for the voltage $V_{s/}$ to reach the $V_{op}$ of the operational amplifier 15 is lengthened, and the on period of the switching element 2 gets longer, thereby compensating for a drop in the output voltage. Conversely, when the output voltage $V_{out}$ is higher than the preset voltage, the output voltage $V_{op}$ of the operational amplifier 15 falls and the time required for the voltage $V_{sj}$ to reach the $V_{op}$ of the operational amplifier 15 is shortened, and the on period of the switching element 2 gets shorter, thereby compensating for a rise in the output voltage. The switching control circuit 10 controls the on period of the switching element 2 in this way, regulating the output voltage $V_{out}$.

When the off signal is output by the switching control circuit 10, the transistor 13 is turned off, the transistor 14 is turned on, the switching element 2 is switched off, the diode D2 is turned on, and the voltage at the capacitor C1 is discharged through the diode D2 and transistor 14 to be ready for charging for a next switch-on cycle.

As described above, the switching power supply shown in FIG. 5, comprising the current-mode control device 5, reliably outputs the preset output voltage $V_{out}$ by switching-controlling the switching element 2 through current-mode control using the current-mode control device 5.

It is known that a duty factor (the ratio of the on period t to the switching period T (t/T)) of 50% or higher of the pulse signal output by the switching control circuit 10 helps increase circuit efficiency of the switching power supply. At a duty factor of 50% or higher, however, a low-frequency oscillation takes place, destabilizing the operation of the switching power supply.

The current-mode control device 5 disclosed in the above-cited Japanese Examined Utility Model Publication No. 7-39346 is provided with the slope compensation circuit 18 to restrict low-frequency oscillations, and the gradient (slope) of the voltage $V_{sp}$ is compensated for by superimposing the output voltage of the slope compensation circuit 18 onto the output voltage $V_{sp}$ of the current sense circuit 16 so that the voltage $V_{sj}$ greater than the voltage $V_{sp}$ in gradient is fed to the switching control circuit 10, and the generation of the low-frequency oscillations is restricted even at a duty factor of 50% or higher and the operation of the switching power supply is thus stabilized.

The reason for this is as follows. For example, when the preset output voltage $V_{out}$ is reliably output by the switching power supply having the current-mode control device 5 without slope compensation circuit 18 shown in FIG. 5, the voltage $V_{sp}$ from the current sense circuit 16 fed to the switching control circuit 10 changes in a sawtooth voltage waveform shown by the full line A in FIG. 7 in accordance with the change in the switching current $I_{sw}$ of the switching element 2.

More particularly, the voltage $V_{sp}$ takes the following voltage waveform, wherein, when the switching element 2 is turned on by the switching control circuit 10, the output voltage $V_{sp}$ of the current sense circuit 16 rises and reaches a voltage $V_{on}$, for example, and the output voltage $V_{sp}$ of the current sense circuit 16 increases at a gradient m1 of the straight line of a linear function with time during the switch-on period of the switching element 2, and when the switching element 2 is turned off by the switching control circuit 10, the output voltage $V_{sp}$ of the current sense circuit 16 drops to zero, and when the switching element 2 is turned on next time, the output voltage $V_{sp}$ rises to the voltage $V_{on}$ determined by a gradient m2 represented by a dot-dash line B during the switch-off period shown in FIG. 7.

When the output voltage $V_{sp}$ of the current sense circuit 16 rises to a voltage deviating from the voltage Von with the switching element 2 turned on, the voltage $V_{sp}$ increases, as shown by a dotted line D, at a gradient identical to the gradient m1 represented by the full line A in FIG. 7, and the output voltage value of the current sense circuit 16 at the rise of the next switch-on is determined by a dot-dash line C having a gradient identical to the gradient $m_2$ represented by the dot-dash line B, and with the slope compensation circuit 18 omitted, a deviation $\Delta V1$ of the output voltage $V_{sp}$ of the current sense circuit 16 from the voltage $V_{on}$ at the turn-on of the switching element 2 is expressed as $\Delta V_1 = (m_2/m_1) \cdot \Delta V_0$ where $\Delta V_0$ designates the preceding deviation.

When the duty factor is 50% or higher, the absolute value of the gradient $m_1$ of the voltage $V_{sp}$, during the switch-on period, applied to the switching control circuit 10 is smaller than the absolute value of the gradient $m_2$ represented by the dot-dash line during the switch-off period ( i.e., $|m_2/m_1|>1$). Thus, the deviation of the output voltage $V_{sp}$ of the current sense circuit 16 from the voltage $V_{on}$ increases each time the switching element 2 is switched on (i.e., $\Delta V_1 > \Delta V_0$), failing to converge and generating low-frequency oscillations, and once the switching power supply runs out of its stable operational state, it remains unable to revert back to its stable operation state due to the low-frequency oscillations, leading to an unstable operation of the switching power supply.

For this reason, the circuit shown in FIG. 5 includes the slope compensation circuit 18, and compensates for the gradient (slope) of the output voltage $V_{sp}$ of the current sense circuit 16 during the switch-on period of the switching element 2, using the slope compensation circuit 18 as shown in FIG. 6C and attempts to avoid generating the low-frequency oscillations by applying to the switching control circuit 10 the voltage $V_{sj}$ having a gradient greater than the gradient ml of the output voltage $V_{sp}$ of the current sense circuit 16.

The applicants of the present application produced the switching power supply shown in FIG. 5 on an experimental basis, and found that an insufficient restriction of the low-frequency oscillations possibly led to an unstable operation of the switching power supply.

The present invention has been developed with a view to resolving the above problem, and the object of the present invention is to provide a current-mode control device that restricts low-frequency oscillations and stabilizes the circuit operation of a switching power supply even if the switching control of a switching element is performed at a duty factor of 50% or higher.

SUMMARY OF THE INVENTION

According to the present invention, a current-mode control device for controlling an output voltage of a DC power supply comprises: a switching element for supplying an output voltage of the DC power supply through an on/off switching action; an output voltage detector circuit for detecting the output voltage of the DC power supply and outputting an output voltage based on the output voltage of the DC power supply; a current sense circuit for converting into a voltage a switching current flowing through the switching element during a switch-on period of the switching element thereby to sense and output an output voltage corresponding to the switching current; an integrating circuit for converting the switching current of the switching circuit that increases with a gradient of a straight line linear function with time during the switch-on period of the switching element into a voltage that increases at a rate defined by a quadratic or higher-order curved line with time by integrating the switching current of the switching circuit at least once to produce a resulting output voltage and for superimposing the resulting output voltage on the output voltage of the current sense circuit; and a switching control circuit for controlling the on/off switching action of the switching element in response to the output voltage of the output voltage detector circuit and the output voltage of the current sense circuit on which the resulting output voltage of the integrating circuit is superimposed such that the output voltage of the DC power supply is stabilized.

A switching power supply according to the invention comprises: a DC power supply; the current-mode control device described above; a transformer having a primary coil connected in series with the DC power supply and a secondary coil; and a rectifying and smoothing circuit connected to the secondary coil of the transformer.

According to the present invention, the integrating circuit in the slope compensation circuit integrates at least once the switching current of the switching circuit that increases at the gradient of the straight line of the linear function with the time lapse of the switch-on period of the switching element, for conversion into a voltage that increases at a quadratic or higher-order curved line with time and outputs the resulting voltage. During the switch-on period of the switching element, the current sense circuit converts the switching current of the switching element directly or indirectly into a voltage and detects and outputs the voltage, the output voltage of the integrating circuit is superimposed on the output voltage of the current sense circuit to compensate for the slope of the output voltage of the current sense circuit, and the voltage increasing at the quadratic or higher-order curved line with time is fed from the current sense circuit to the switching control circuit.

The gradient of the voltage of the quadratic or higher-order curved line fed to the switching control circuit is increased with the time lapse from the switch-on, and when the switching control is performed at a duty factor of 50% or higher, the time between the switch-on and the switch-off of the switching element is lengthened, the gradient of the voltage of the quadratic or higher-order curved line immediately prior to the switch-off becomes large, and for this reason, the generation of low-frequency oscillations is fully restricted even with the switching element switching-controlled at a duty factor of 50% or higher, and the circuit operation of the switching power supply is stabilized.

For the purpose of illustrating the invention, there is shown in the drawings several forms which are presently preferred, it being understood, however, that the invention is not limited to the precise arrangements and components shown.

Other features and advantages of the present invention will become apparent from the following description of the invention which refers to the accompanying drawings.

BRIEF DESCRIPTION OF THE DRAWING(S)

DETAILED DESCRIPTION OF EMBODIMENTS OF THE INVENTION

Hereinafter, the preferred embodiments of the present invention are explained in detail with reference to the drawings.

Figure 1:
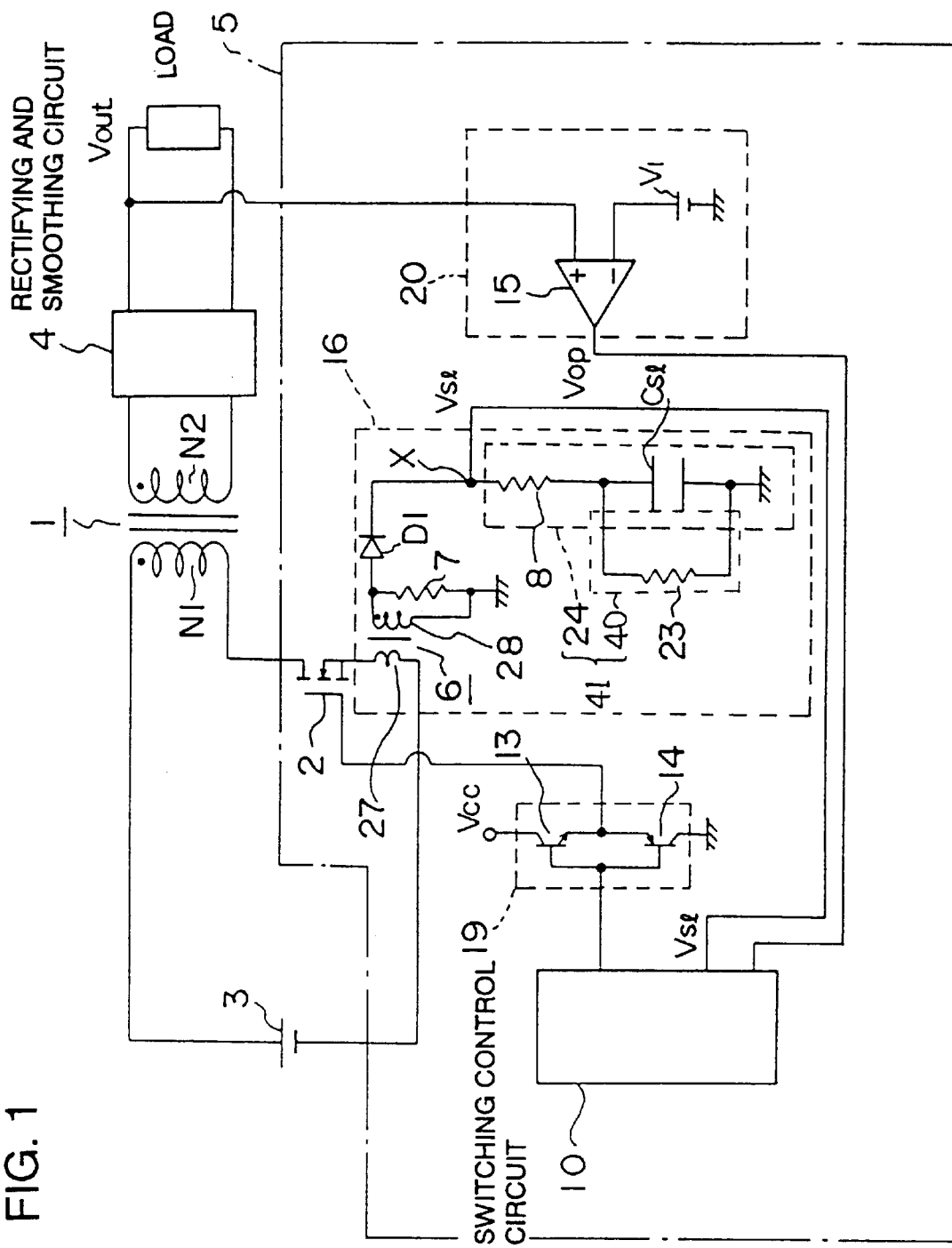
FIG. 1 is a schematic diagram of a first embodiment.
Figure 2A:
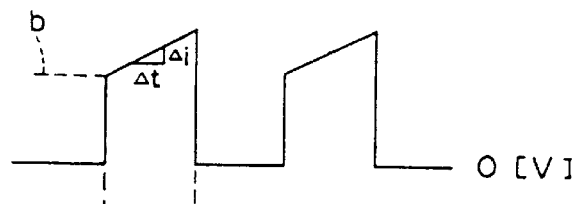
FIGS. 2A to 2C are timing diagrams showing the circuit operation of the slope compensation circuit shown in FIG. 1.
Figure 2B:
Figure 2C:
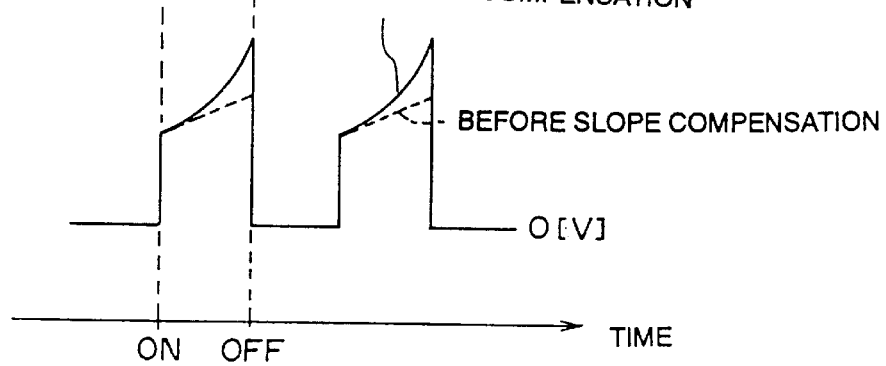
Figure 5:
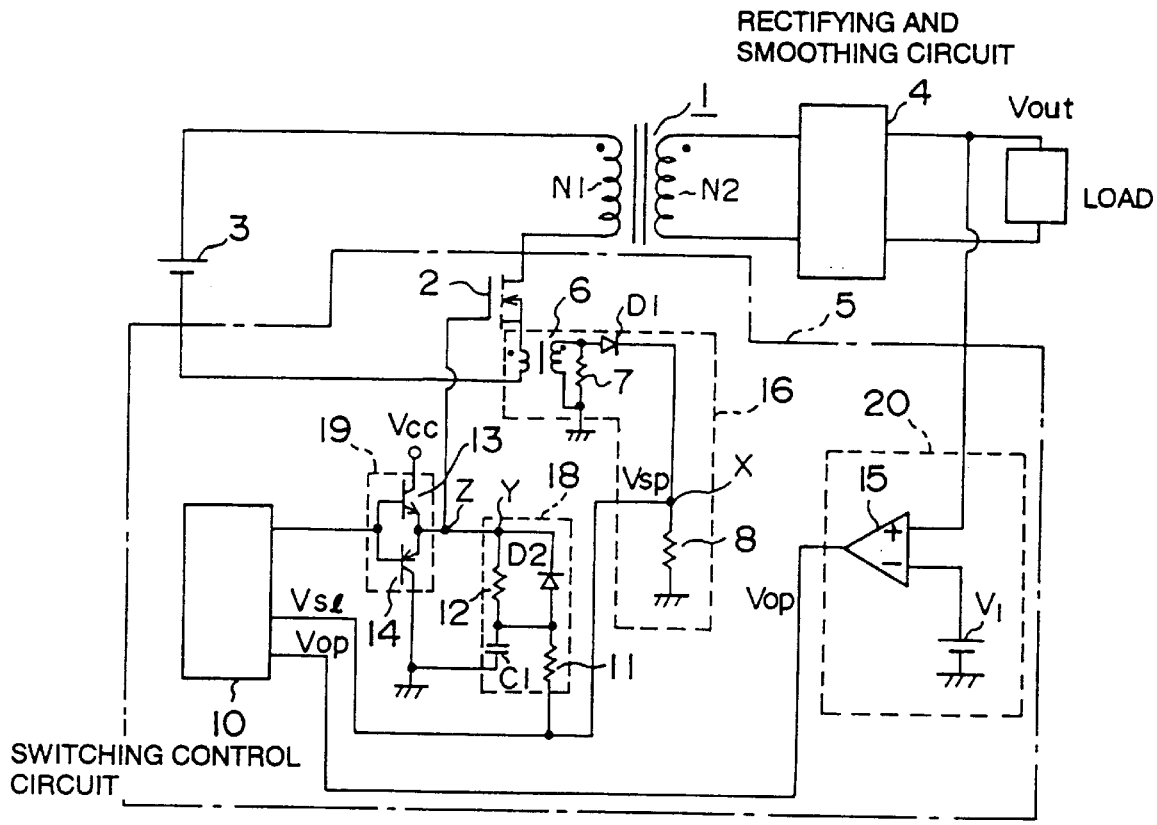
FIG. 5 is a schematic diagram showing the prior art.
Figure 6A:
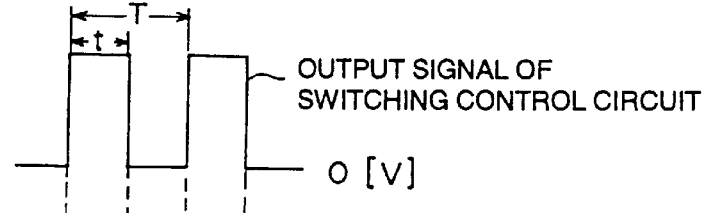
FIGS. 6A to 6C are timing diagrams showing the operation of the circuit shown in FIG. 5.
Figure 6B:
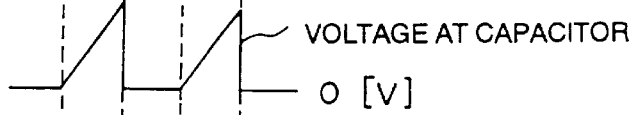
Figure 6C:
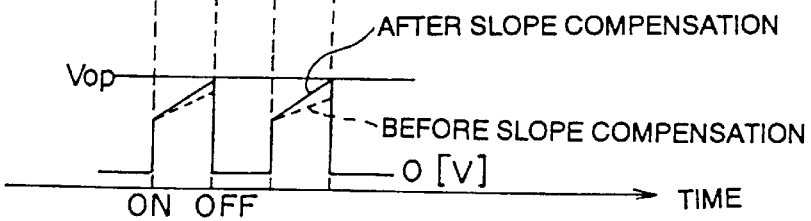

FIG. 1 shows a switching power supply having a current-mode control device with a slope compensation circuit according to a first embodiment of the present invention. This embodiment is different from the related art shown in FIG. 5 in that rather than arranging a slope compensation circuit 18 between the output side of a current sense circuit 16 and the output side of a switching control circuit 10, a slope compensation circuit is arranged in the current sense circuit 16 so that the voltage $V_{sj}$ having a quadratic curved line represented by a full line in FIG. 2C is fed from the current sense circuit 16 to the switching control circuit 10. In FIG. 1, components identical to those described with reference to FIG. 5 are designated with the same reference numerals and the explanation about them is omitted.

In this embodiment, as shown in FIG. 1, one terminal of capacitor $C_{sj}$ is connected to one terminal (ground end) of a resistor 8 of the current sense circuit 16, the other terminal of the capacitor $C_{sj}$ is grounded, a resistor 23 is connected in parallel with the capacitor $C_{sj}$, an integrating circuit 24 is made of the resistor 8 and the capacitor $C_{sj}$, the resistor 23 constitutes a discharging circuit 40 for discharging a voltage at the capacitor $C_{sj}$, and the slope compensation circuit 41 comprises the integrating circuit 24 and the discharging circuit 40.

The first embodiment is thus constructed, and the circuit operation of the slope compensation circuit in this embodiment is now briefly discussed. When an on signal is issued from the switching control circuit 10, transistor 13 is turned on and switching element 2 is switched on, and during the switch-on period of the switching element 2, a current $I_{sw}$ increases at a gradient of a linear straight line with time as shown in FIG. 2A. The switching current $I_{sw}$ of the switching element 2 during the switch-on period is expressed by the following equation (1).

$$I_{sw} = at + b \qquad (1)$$

In the above equation, a is a gradient ($\Delta i/\Delta t$) of the change of the switching current $I_{sw}$, t is time, and b is the value of the switching current $I_{sw}$ during the turn-on period.

When a voltage is induced in a current transformer 6 in response to the switching current of the switching element 2, a current having a gradient identical to the gradient a of the switching current of the switching element 2 flows into the capacitor $C_{sj}$ of the integrating circuit 24 via diode D1 and resistor 8 to charge the capacitor $C_{sj}$. The voltage at the capacitor $C_{sj}$ is a voltage that is obtained by integrating once the switching current of the switching element 2, and increases at a rate defined by a quadratic curved line with time as shown in FIG. 2B. The voltage $V_{cc}$ of the capacitor $C_{sj}$ a the function of time, and is expressed by the following equation (2).

$$V_{cc} = (\tfrac{1}{2}) \cdot (a/n) \cdot t^2 + (b/n) \cdot t \qquad (2)$$

In the above equation, a is the gradient of the switching current $I_{sw}$ of the switching element 2, b is the value of the switching current of the switching element 2 during the turn-on, n is a ratio of windings of the current transformer 6 ((number of windings of secondary coil 28)/(number of windings of primary coil 27)).

The voltage at the capacitor $C_{sj}$ is superimposed on a voltage $V_{sp}$, represented by a dotted line in FIG. 2C, output by the diode D1, thereby compensating for the slope of the voltage $V_{sp}$, and the current sense circuit 16 outputs to the switching control circuit 10 a voltage $V_{sj}$ increasing at a rate defined by a quadratic curved line with time as shown by the full line in FIG. 2C.

When the switching control circuit 10 outputs an off signal, as already described, the transistor 13 is turned off and the switching element 2 is switched off, causing the switching current of the switching element 2 to drop to zero, the current the current transformer 6 feeds to the capacitor $C_{s/}$ is cut off, and the capacitor $C_{s/}$ discharges its voltage through the resistor 23 of the discharging circuit to be ready for a charging action during a next switch-on action.

In this embodiment, the integrating circuit 24, arranged in the output side of the current sense circuit 16, integrates the switching current of the switching element 2 having the gradient of a linear straight line, detected by the current transformer 6 of the current sense circuit 16, to obtain the voltage defined by a quadratic curved line, and this voltage Vec defined by the quadratic curved line is superimposed on the output voltage $V_{sp}$ from the current transformer 6 to compensate for the slope of the voltage $V_{sp}$, and the voltage $V_{s/}$ defined by the quadratic curved line is output by the current sense circuit 16 and is then fed to the switching control circuit 10.

Figure 7:
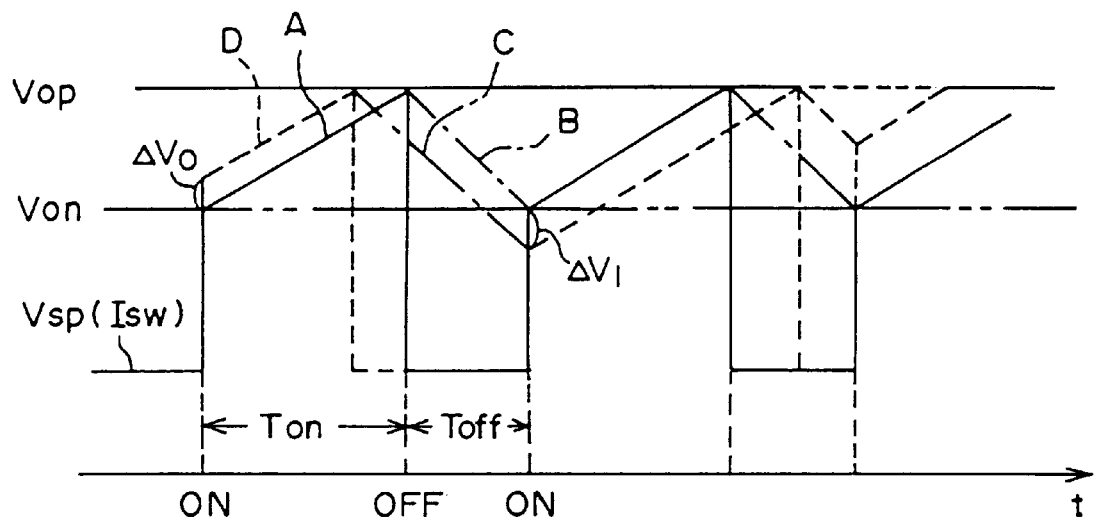
FIG. 7 is an explanatory diagram showing the generation of low-frequency oscillations with reference to the prior art circuit of FIG. 5.

The gradient $m_1$ of the voltage $V_{s/}$ fed to the switching control circuit 10 increases with time lapse from the time of the switch-on of the switching element 2, and when the switching control of the switching element 2 is performed at a duty factor of 50% or higher, the time between the switch-on and the switch-off of the switching element is lengthened, and the gradient m1 of the voltage $V_{s/}$ immediately prior to the switch-off is substantially greater than the gradient ml of the voltage $V_{s/}$ in the circuit shown in FIG. 5 immediately prior to the switch-off, and is also substantially greater than the gradient $m_2$ of the straight line represented by the dot-dash line during the switch-off period of the switching element 2, shown in FIG. 7.

As understood from equation (2), the greater the gradient m1 of the voltage $V_{s/}$ immediately prior to the switch-off of the switching element 2, the quicker the deviation of the voltage $V_{sp}$ at the switch-on from the voltage Von converges, and since, in this embodiment, the switching control of the switching element 2 at a duty factor of 50% or higher helps increase the gradient m1 of the voltage $V_{s/}$ immediately prior to the switch-off of the switching element 2, the deviation of the voltage $V_{sp}$ is immediately converged, and the generation of the low-frequency oscillations is avoided. Since the generation of the low-frequency oscillations is avoided even with the switching element 2 switching-controlled, the switching power supply operates in a stable operational state.

As described above, this embodiment has the advantage that both an increased circuit efficiency of the switching power supply and a reliable restriction of the low-frequency oscillations are attained at the same time.

This embodiment presents the above advantage by simply connecting the capacitor $C_{s/}$ in series with the resistor 8 of the current sense circuit 16, and compared with the circuit shown in FIG. 5, this embodiment results in a simplified circuit arrangement with a reduced component count, leading to a cost reduction of the device and thereby the supply of an inexpensive device.

A second embodiment is now discussed with reference to FIG. 3. In this embodiment, instead of using the resistor 23 shown in FIG. 1, the anode of a diode D is connected to the node of the resistor 8 and the capacitor $C_{s/}$, the cathode of the diode D is connected to the node of the emitters of transistors 13 and 14 in a drive circuit 19, and a discharging circuit 42 for discharging the voltage at the capacitor $C_{s/}$ is thus made of the diode D and the transistor 14. The rest of the circuit remains unchanged from that of the first embodiment, and in FIG. 3, components identical to those described with reference to FIG. 1 are designated with the same reference numerals and the explanation about them is omitted.

In the second embodiment, the switching control action by the switching control circuit 10 turns the transistor 13 off and the transistor 14 on thereby switching off the switching element 2, and the diode D becomes conductive, and the capacitor $C_{s/}$ charged to the voltage Vec during the switch-on period of the switching element 2 is discharged through the diode D and the transistor 14.

In the above embodiment, in the same manner as in the first embodiment, the integrating circuit 24, arranged in the current sense circuit 16, integrates the switching current of the switching element 2 detected by the current transformer 6 to output the voltage Vec having the gradient of the quadratic curved line. This voltage Vec is superimposed on the output voltage $V_{sp}$ from the current transformer 6 to compensate for the slope of the voltage $V_{sp}$, and the voltage $V_{s/}$ defined by the quadratic curved line is output by the current sense circuit 16 and is then fed to the switching control circuit 10. When the switching control of the switching element 2 is performed at a duty factor of 50% or higher, the gradient m1 of the voltage $V_{s/}$ immediately prior to the switch-off of the switching element 2, supplied from the current sense circuit 16 to the switching control circuit 10, becomes substantially large, and when the switching control of the switching element 2 is performed at a duty factor of 50% or higher, the generation of the low-frequency oscillations is avoided. This embodiment presents the advantage that both an increased circuit efficiency of the switching power supply and a reliable restriction of the low-frequency oscillations are attained at the same time.

A third embodiment is now discussed with reference to FIG. 4. In this embodiment, the current sense circuit 16 detects directly the switching current of the switching element 2 and has a circuit arrangement for compensating for slope so that the voltage supplied from the current sense circuit 16 to the switching control circuit 10 is defined by a quadratic curved line. That is, the current sense circuit 16 constitutes an integrating circuit by itself. The rest of the construction of the embodiment remains unchanged from that of the preceding embodiments, and the explanation about the common portion is omitted.

Figure 4:
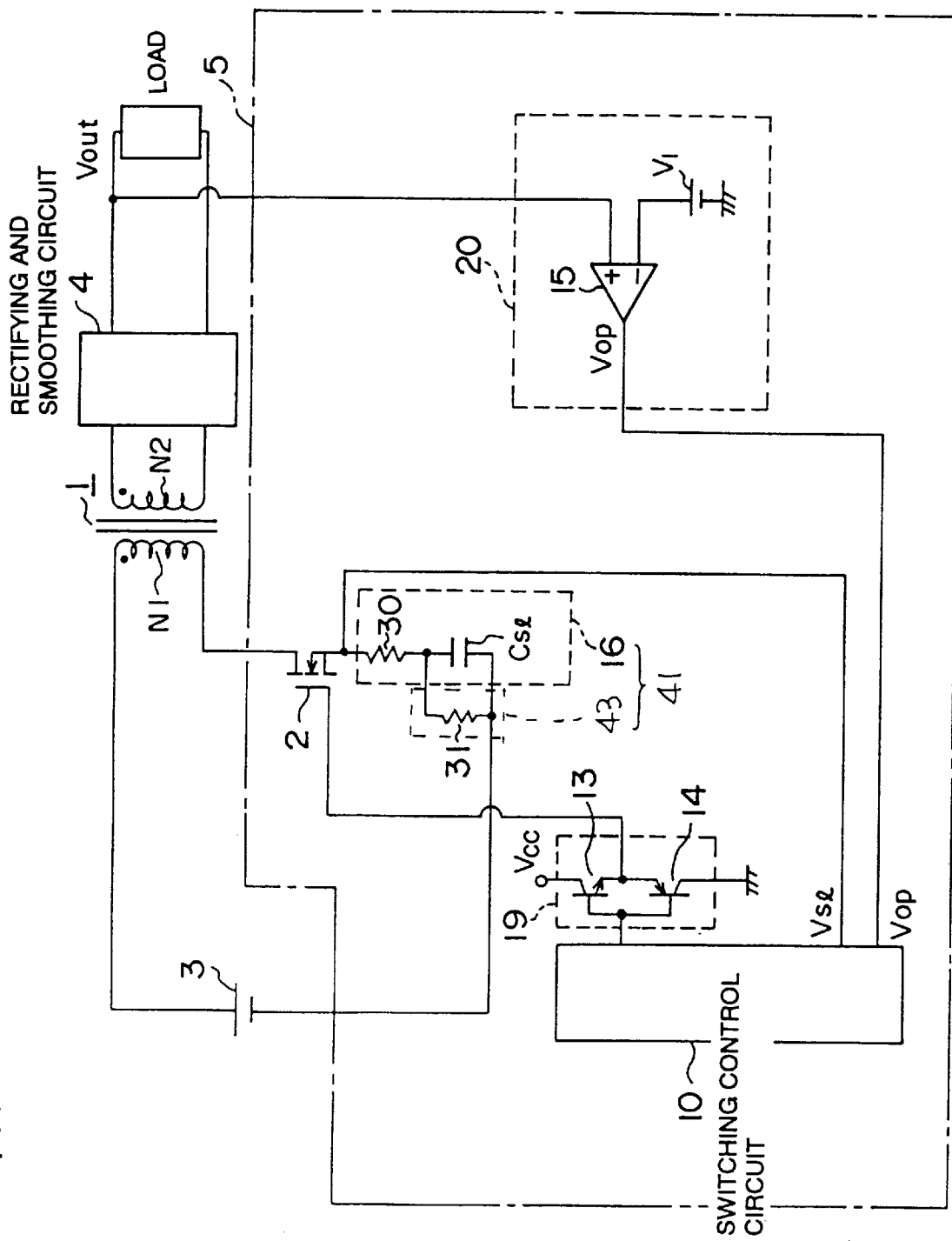
FIG. 4 is a schematic diagram of a third embodiment.

Referring to FIG. 4, in this embodiment, one terminal of a resistor 30 is connected to the source of a switching element 2, one terminal of a capacitor $C_{s/}$ is connected in series with the other terminal of the resistor 30, and the other terminal of the capacitor $C_{s/}$ is connected to the negative terminal of a DC power supply 3. A resistor 31 is connected in parallel with the capacitor $C_{s/}$. The resistor 30 and the capacitor $C_{s/}$ detect a switching current of the switching element 2, and constitute a current sense circuit 16 having the integrating function of integrating the switching current. The resistor 31 constitutes a discharging circuit 43 for discharging the voltage of the capacitor $C_{s/}$, and the current sense circuit 16 and the discharging circuit 43 constitute a slope compensation circuit 41.

In the circuit shown in FIG. 4, the switching control by the switching control circuit 10 turns the switching element 2 on, the current of the DC power supply 3 is conducted through the switching element 2, resistor 30, and capacitor $C_{s/}$, the switching current $I_{sw}$ of the switching element 2 shown in FIG. 2A is detected and converted into the voltage $V_{sp}$ by the resistor 30. The capacitor $C_{s/}$ is thus charged with the voltage Vec shown in FIG. 2B that is obtained by integrating the switching current $I_{sw}$ of the switching element 2.

The voltage Vec at the capacitor $C_{sl}$ is superimposed on the voltage $V_{sp}$, arising from the switching current $I_{sw}$ of the switching element 2, detected by the resistor 30 to compensate for the slope of the voltage $V_{sp}$, and in the same manner as in the preceding embodiments, the voltage $V_{sl}$ having a gradient of a quadratic curved line is fed from the current sense circuit 16 to the switching control circuit 10.

When the switching control by the switching control circuit 10 switches the switching element 2 off, the transistor 14 is turned on, and the capacitor $C_{sl}$ discharges its voltage through the resistor 31 to be ready for charging for a next switch-on.

In the above embodiment, the switching current of the switching element 2 is detected, the detected current is integrated to obtain the voltage having the gradient of the quadratic curved line, the voltage having the gradient of the quadratic curved line is then fed from the current sense circuit 16 to the switching control circuit 10 to compensate for voltage slope, and thus the voltage $V_{sl}$ increasing at the rate of a quadratic curved line with time is fed from the switching control circuit 10 to the current sense circuit 16, and when the switching control of the switching element 2 is performed at a duty factor of 50% or higher, the generation of the low-frequency oscillations avoided, and the operation of the switching power supply is stabilized.

Figure 3:
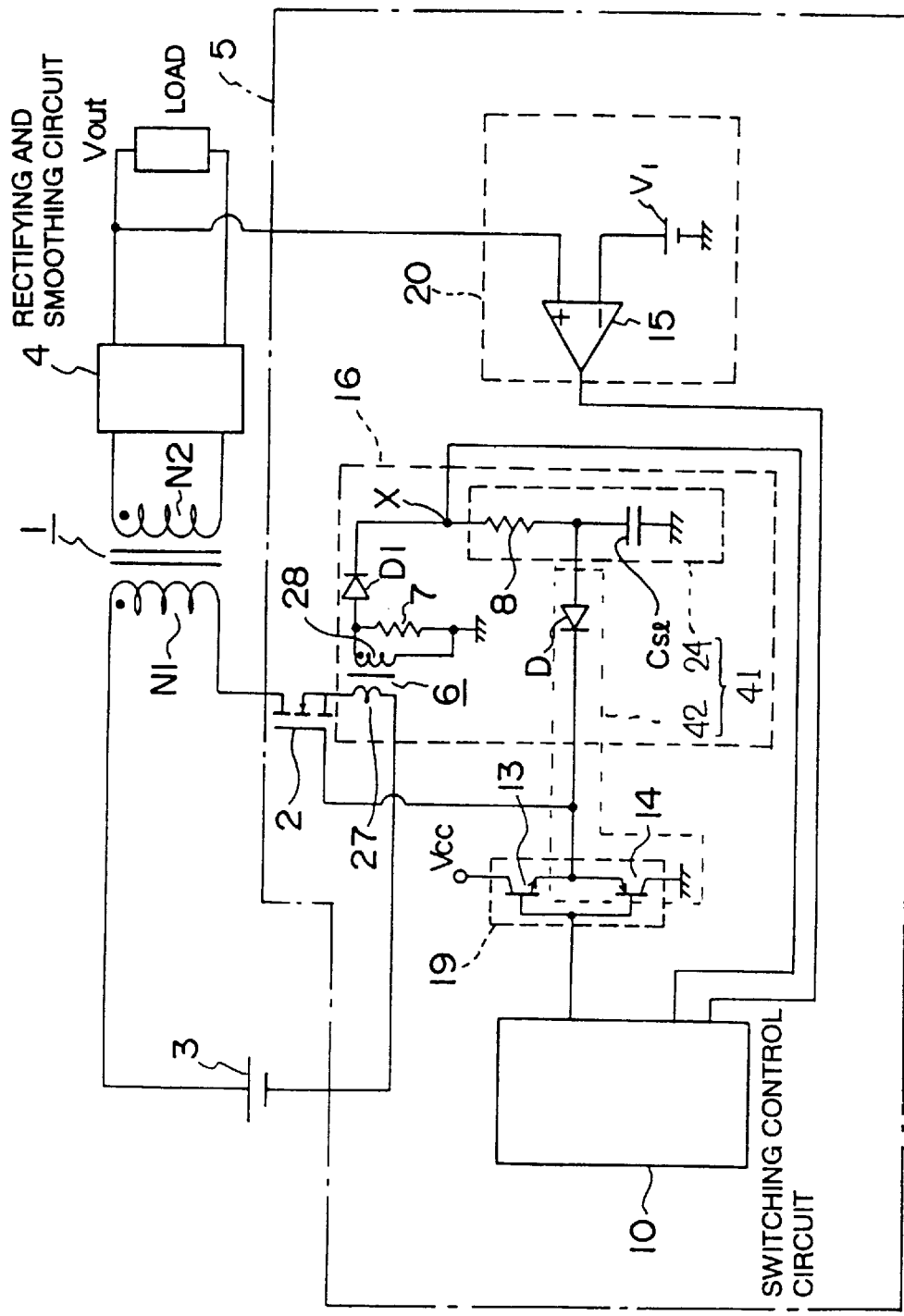
FIG. 3 is a schematic diagram of a second embodiment.

Since the current transformer 6, resistor 7 and diode D1 for detecting the switching current of the switching element 2, shown in FIGS. 1 and 3, are dispensed with in this embodiment, the component count of the device is even more reduced. Because of the bulk of the current transformer 6, the removal of the current transformer 6 helps make compact the switching power supply.

The present invention is not limited to the above embodiments, and a variety of embodiments are possible. For example, although the current sense circuit 6 is designed to detect the switching current of the switching element 2 at the primary coil N1 in each of the above embodiments, the current sense circuit 6 may be alternatively designed to detect the switching current of the switching element 2 at the secondary coil N2.

Each of the above embodiments comprises a single integrating circuit that integrates the switching current of the switching element 2 to obtain a voltage defined by a quadratic curved line for the compensation of the output voltage of the current sense circuit 16, but at least one integrating circuit may be additionally arranged on the output side of the integrating circuit 24 shown in each of the above embodiments, and the switching current of the switching element 2 is at least twice integrated to obtain a voltage having a curved line of third-order or higher-order to compensate for the voltage slope of the output voltage of the current sense circuit 16.

Although the slope compensation circuit in each of the above embodiments is the one included into the current-mode control device 5 as shown in FIG. 1, FIG. 3 or FIG. 4, the slope compensation circuit in the current-mode control device of this invention may be included into any type of current-mode control device as long as it performs a switching control of a switching element through a current mode control to regulate the output voltage $V_{out}$, and although the current-mode control device 5 is included in the isolated switching power supply having the transformer 1 in each of the above embodiments, the present invention may be applied to the case in which the current-mode control device 5 is included in an apparatus having a circuit other than the circuit arrangement shown in FIG. 1, FIG. 3 or FIG. 4 such as a non-isolated switching power supply having no transformer, a DC-DC converter or the like.

As has been explained herein above, according to the present invention, the switching current of the switching element increasing at the gradient of the linear straight line with time is integrated at least once for conversion into a voltage increasing at the rate of a quadratic or higher-order curved line with time, the voltage increasing at the rate of the quadratic or higher-order curved line with time is superimposed on the output voltage of the current sense circuit, and the voltage increasing at the rate of the quadratic or higher-order curved line with time is fed from the current sense circuit to the switching control circuit, and the gradient of the voltage fed from the current sense circuit to the switching control circuit is increased during the switch-on period of the switching element, and when the switching element is switching-controlled at a duty factor of 50% or higher, the time between the switch-on and the switch-off of the switching element is long, and depending on the magnitude of the gradient of the voltage, the low-frequency oscillations are controlled even when the switching element is switching-controlled at a duty factor of 50% or higher.

Even when the switching element is switching-controlled at a duty factor of 50% or higher, the generation of the low-frequency oscillations is reliably controlled, the switching power supply that incorporates the slope compensation circuit of the current-mode control device of the present invention is reliably operated, and by allowing the switching element to operate at a duty factor of 50% or higher, the circuit efficiency of an apparatus such as the switching power supply is enhanced.

While preferred embodiments of the invention have been disclosed, various modes of carrying out the principles disclosed herein are contemplated as being within the scope of the following claims. Therefore, it is understood that the scope of the invention is not to be limited except as otherwise set forth in the claims.

What is claimed is:

1. A current-mode control device for controlling an output voltage of a DC power supply, comprising:

a switching element for supplying an output voltage of the DC power supply through an on/off switching action;

an output voltage detector circuit for detecting the output voltage of the DC power supply and outputting an output voltage based on the output voltage of the DC power supply;

a current sense circuit for converting into a voltage a switching current flowing through the switching element during a switch-on period of the switching element thereby to sense and output an output voltage corresponding to the switching current;

an integrating circuit for converting the switching current of the switching circuit that increases at a gradient of a straight line linear function with time during the switch-on period of the switching element into a voltage that increases at a rate defined by a quadratic or higher-order curved line with time by integrating the switching current of the switching circuit at least once to produce a resulting output voltage and for superimposing the resulting output voltage on the output voltage of the current sense circuit; and a switching control circuit for controlling the on/off switching action of the switching element in response to the output voltage of the output voltage detector circuit and the output voltage of the current sense circuit on which the output voltage of the integrating circuit is superimposed such that the output voltage of the DC power supply is stabilized.

2. The device of claim 1, wherein the integrating circuit comprises a capacitor connected in series with an output of the current sense circuit.

3. The device of claim 2, further comprising a discharge circuit for the capacitor.

4. The device of claim 3, wherein the discharge circuit comprises a resistor coupled across the capacitor.

5. The device of claim 3, wherein the discharge circuit comprises a transistor of a driving circuit driving the switching element.

6. A switching power supply comprising:

a DC power supply;

a current-mode control device for controlling an output voltage of the DC power supply having a switching element for supplying an output voltage of the DC power supply through an on/off switching action; an output voltage detector circuit for detecting the output voltage of the DC power supply and outputting an output voltage based on the output voltage of the DC power supply; a current sense circuit for converting into a voltage a switching current flowing through the switching element during a switch-on period of the switching element thereby to sense and output an output voltage corresponding to the switching current; an integrating circuit for converting the switching current of the switching circuit that increases at a gradient of a straight line linear function with time during the switch-on period of the switching element into a voltage that increases at a rate defined by a quadratic or higher-order curved line with time by integrating the switching current of the switching circuit at least once to produce a resulting output voltage and for superimposing the resulting output voltage on the output voltage of the current sense circuit; and a switching control circuit for controlling the on/off switching action of the switching element in response to the output voltage of the output voltage detector circuit and the output voltage of the current sense circuit on which the output voltage of the integrating circuit is superimposed such that the output voltage of the DC power supply is stabilized; and further comprising:

a transformer having a primary and a secondary coil, the primary coil being connected in series with the DC power supply; and a rectifying and smoothing circuit connected to the secondary coil of the transformer.

7. A switching power supply comprising:

a DC power supply;

a current-mode control device for controlling an output voltage of the DC power supply having a switching element for supplying an output voltage of the DC power supply through an on/off switching action; an output voltage detector circuit for detecting the output voltage of the DC power supply and outputting an output voltage based on the output voltage of the DC power supply; a current sense circuit for converting into a voltage a switching current flowing through the switching element during a switch-on period of the switching element thereby to sense and output an output voltage corresponding to the switching current; an integrating circuit for converting the switching current of the switching circuit that increases at a gradient of a straight line linear function with time during the switch-on period of the switching element into a voltage that increases at a rate defined by a quadratic or higher-order curved line with time by integrating the switching current of the switching circuit at least once to produce a resulting output voltage and for superimposing the resulting output voltage on the output voltage of the current sense circuit; and a switching control circuit for controlling the on/off switching action of the switching element in response to the output voltage of the output voltage detector circuit and the output voltage of the current sense circuit on which the output voltage of the integrating circuit is superimposed such that the output voltage of the DC power supply is stabilized; and further wherein the integrating circuit comprises a capacitor connected in series with an output of the current sense circuit; and further comprising a transformer having a primary and a secondary coil, the primary coil being connected in series with the DC power supply; and a rectifying and smoothing circuit connected to the secondary coil of the transformer.

8. The switching power supply of claim 7, further comprising a discharge circuit for the capacitor.

9. The switching power supply of claim 8, wherein the discharge circuit comprises a resistor coupled across the capacitor.

10. The switching power supply of claim 8, wherein the discharge circuit comprises a transistor of a driving circuit driving the switching element.

* * * * *